Feb. 8, 1944. A. LANG ET AL 2,340,890
METHOD AND APPARATUS FOR STERILIZING, PRESERVING,
AND IRRADIATING OF VARIOUS LIQUID SUBSTANCES
Filed Feb. 25, 1941   3 Sheets-Sheet 1
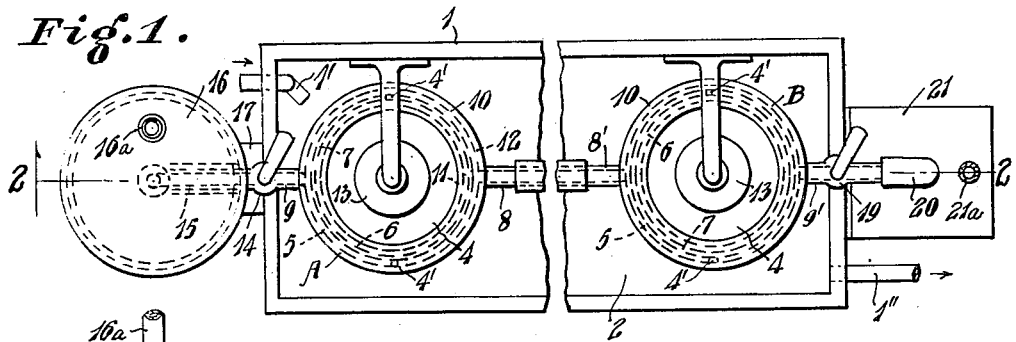
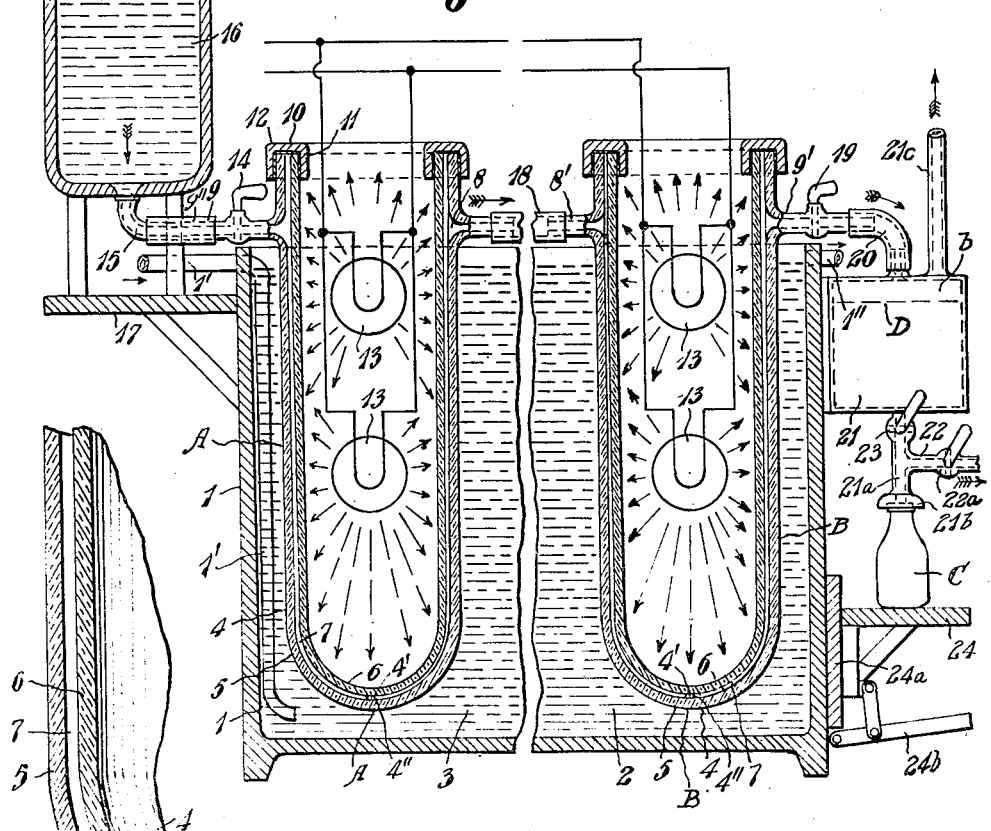
INVENTORS
ALPHONSE LANG
GEORGE S. HAWKE
BY
ATTORNEY.

Feb. 8, 1944. A. LANG ET AL 2,340,890
METHOD AND APPARATUS FOR STERILIZING, PRESERVING,
AND IRRADIATING OF VARIOUS LIQUID SUBSTANCES
Filed Feb. 25, 1941 3 Sheets-Sheet 2
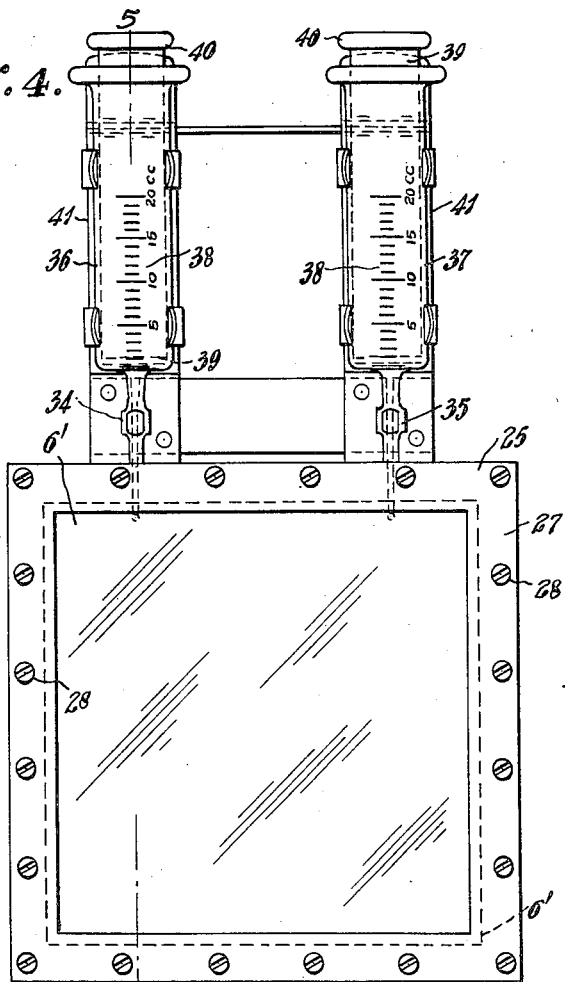
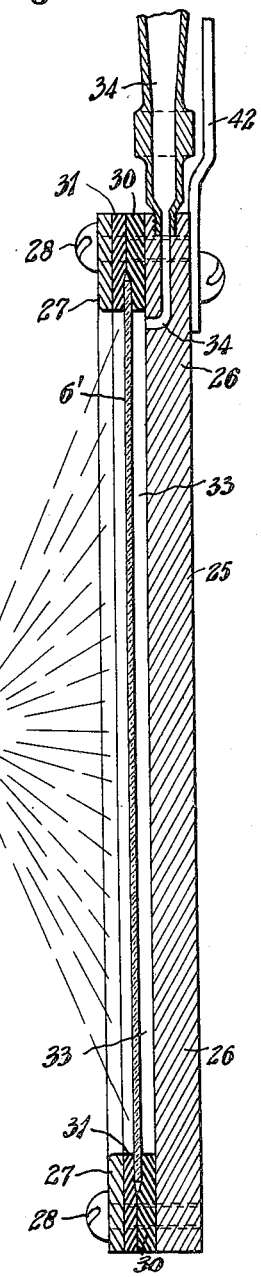
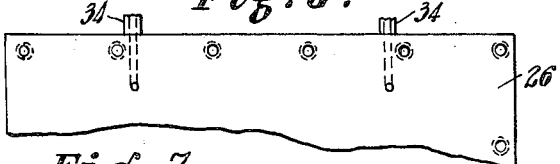
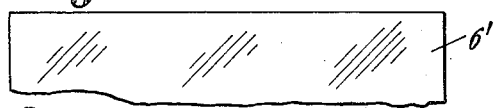
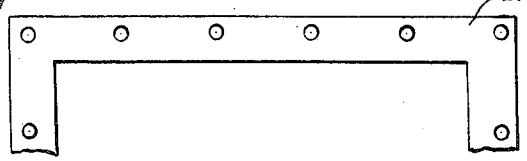
INVENTORS
ALPHONSE LANG
GEORGE S. HAWKE
BY
ATTORNEY.

Feb. 8, 1944.                A. LANG ET AL                     2,340,890
        METHOD AND APPARATUS FOR STERILIZING, PRESERVING,
         AND IRRADIATING OF VARIOUS LIQUID SUBSTANCES
                   Filed Feb. 25, 1941         3 Sheets-Sheet 3

INVENTOR
ALPHONSE LANG
GEORGE S. HAWKE
BY
Albert H. Robinson
ATTORNEY.

Patented Feb. 8, 1944

2,340,890

UNITED STATES PATENT OFFICE 2,340,890

METHOD AND APPARATUS FOR STERILIZING, PRESERVING, AND IRRADIATING OF VARIOUS LIQUID SUBSTANCES

Alphonse Lang and George S. Hawke, Cincinnati, Ohio

Application February 25, 1941, Serial No. 380,542

13 Claims. (Cl. 250—48)

This invention relates to a method and apparatus for sterilizing, preserving and irradiating various liquid substances, such as milk, fruit and vegetable juices, vaccines, and the like, which contain bacterial life, and which liquid substances are used by humans and animals as edible food products, or, if vaccines, are injected into their tissue or blood streams for therapeutic measures.

It is particularly adapted for treatment of milk in lieu of pasteurization, the thickness of the milk being reduced to 1 mm. while irradiating same. Reducing the thickness while being irradiated and circulating same through a tortuous path is important to expose all the organisms which might otherwise be concealed behind the fat globules and not be subjected to the rays. The fat particles do not transmit the rays.

Various attempts have heretofore been made to sterilize and preserve edible liquids in sanitary and palatable condition by destroying bacteriological impurities, but this has not been accomplished without impairing their natural inherent bouquet, qualities and characteristics.

One common method of destroying bacteriological impurities involves the use of ultra violet rays applied to liquids as they are conveyed from some open supply source to container, but this is objectionable because the liquids are exposed at some point to the atmosphere which always contains bacteria. Oxygen in the air has a deleterious effect upon the natural flavor of the liquids and their preservation, and any air which is sure to be admitted with the oxygen increases the growth of micro-organisms in the liquids. Another major objection is that heat is generated by mercury vapor arc lamps which raises the temperature and thereby impairs the liquid under treatment. No means has heretofore been employed to overcome this objection.

The present invention employs method and apparatus which permits the liquid substances being treated to have the bacteriological impurities killed without otherwise changing the condition of the liquids. The treated liquids remain in the same condition as they were before being subjected to the treatment, except solely that the bacteria have been killed. They are not otherwise affected.

In instances in which it is not necessary or desirable to remove all bacteriological impurities, the present invention employs method and apparatus which results in an easily measurable reduction in bacterial count in order to positively, reliably and easily comply with all general or local laws regulating such subjects.

Milk, in modern dairies, is drawn from the surface sterilized udder of the cow by conventional commercial vacuum milking machine into a vacuum tank and our invention is particularly adapted for being associated with a commercial vacuum milking machine such as the DeLaval milkers, or the like, fixed or portable, for treating the milk as it is conveyed from that vacuum tank to a vacuum bottling and vacuum capping machine. This permits sterilizing and irradiating the milk in a continuous process of taking it from the udder of the cow and bottling same without breaking the vacuum to permit any bacteriological impurities from the air to gain access to the milk. The thus sterile milk is placed in sterile bottles or other suitable containers and delivered to the consumer without being exposed to the atmosphere at any time after it is taken from its original source in the milk glands of the cow until used.

In treatment of fruit and vegetable juices, the juice may be obtained from the vegetable or fruit in a vacuum tank, from which the juice is conveyed to a vacuum bottling tank and vacuum capping machine in the same general manner as described with milk.

Vaccines are prepared in their usual way and are then passed from any container in which they are suspended to a vacuum container under the process and with the apparatus herein described.

For a better understanding of the invention reference may be made to the accompanying drawings in which:

Fig. 1 is a plan view of an apparatus embodying our invention, the intermediate part being broken away;

Fig. 2 is a vertical longitudinal section of the apparatus on the plane of the line 2—2 of Fig. 1;

Fig. 3 is an enlarged fragmentary corresponding sectional view of one of the double walled vessels;

Fig. 4 is a front elevation of a second embodiment of our invention adapted for portable use;

Fig. 5 is an enlarged front-to-rear vertical section on the plane of the line 5—5 of Fig. 4;

Fig. 6 is a partial front elevation of the base plate which is an element of this second embodiment;

Fig. 7 is a similar view of the light-transmitting plate element of this embodiment;

Fig. 8 is a similar view of one of the two gaskets that are parts of this second embodiment;

Figure 9:
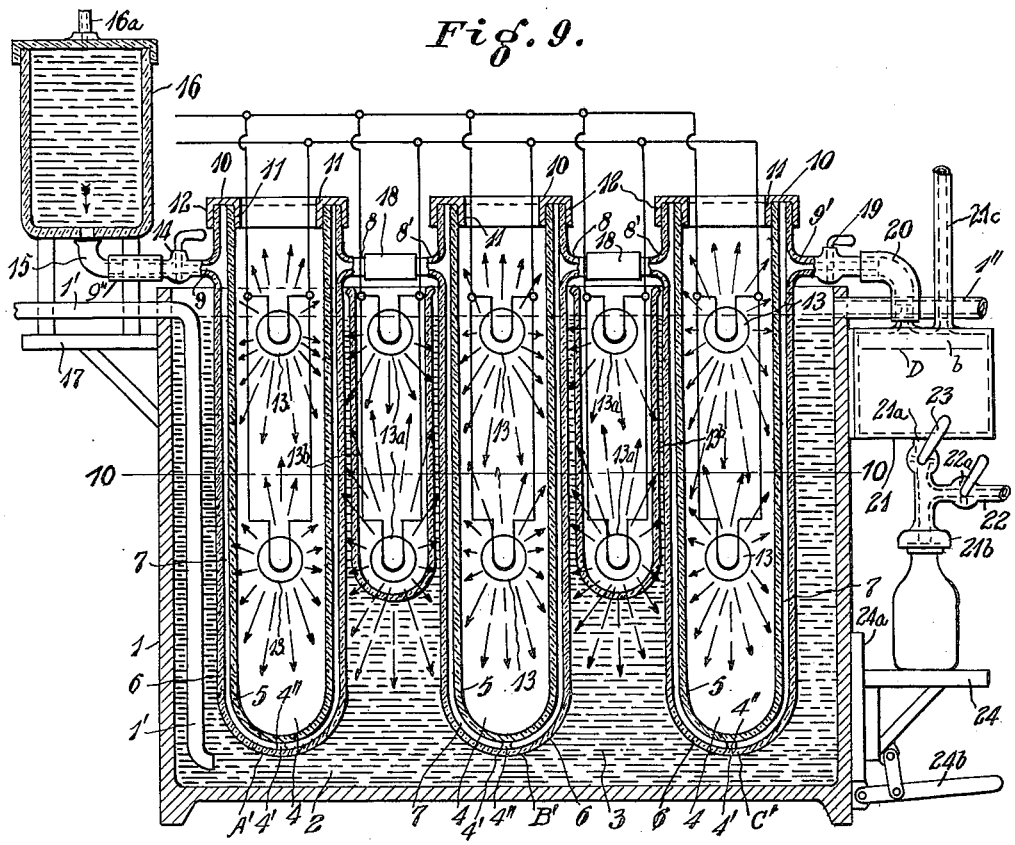
Fig. 9 is a vertical longitudinal section corresponding to that of Fig. 2, illustrating a third embodiment of our invention.

In the example of Figs. 1, 2 and 3, a tank 1 holds in its interior 2 a cooling medium 3, such as ice water, or running tap water, which medium may be continued at any desired level. In the illustrated example provision is made for maintaining a continuous supply and outflow of the cooling medium 3, by an inlet pipe 1' and an outlet pipe 1". The inlet pipe 1', seen at the left, runs down nearly to the bottom of tank 1 to discharge through a curved outlet, from which the medium circulates up around the vessels A and B to flow out through outlet pipe 1", at the right, near the top of the tank 1. In this case, the elevation of outlet pipe 1" determines the height of cooling liquid 3 maintained in tank 1.

Only two vessels A and B are illustrated; but it will be understood that any desired number of such vessels may be included in the series, as may be inferred from the breaking away of the tank and associated parts between the two vessels A and B shown.

Each vessel unit comprises two cylindrical shells 5 and 6 with hemispherical bottoms as here shown. The inner shell 5, of shape uniform with the outer shell 6, is of sufficiently less dimensions than the outer shell to leave a chamber or passageway 7 of the shape of the two shells. As here shown, the vessels A, B, etc., are connected in series by means comprising an outlet 8 for each vessel, connected with an inlet 8' of each succeeding vessel. The first vessel of the series, here vessel A, at the left has its inlet 9 receiving the subject liquid from the source of such liquid; and the last vessel, here B, at the right, has its outlet 9' connected to suitable means for disposal of the subject liquid after the treatment it has received during its passage through the inter-shell passageways 7.

The vessel shells 5 and 6 may have any suitable means for connecting their top rims, sealing the inter-shell space 7; in this example being shown as an annular cap 10 with inner depending flange 11 sealed to the inner surface of inner shell 5 and outer flange 12 sealed to the outer surface of outer shell 6. The shells 5 and 6 being of glass, their upper rims may be fused together. At least the inner shell 5 must be of substance conductive to the waves of radiant energy used, as ultra violet rays the use of which hereinafter is described. Such substance may be fused quartz, for instance; or a glass known as "Corex," identified by its manufacturer, Corning Glass Company, according to variety, D972, D980 and D982. The outer shell 6 also may be of such material. Or, this outer shell 6 may be of some more ordinary glass not transmissive of the rays used, and therefore reflective of such rays, so that there is a return passage of the rays through the subject liquid in space 7.

This space 7 should be of width about one to three millimeters, avoiding the past difficulty in subjecting the liquid in a body of substantially greater thicknesses than has just been mentioned, in that the bacterial count has not been sufficiently reduced. This is due to the ability of the organisms in such fluids as milk to "hide" behind fat globules or particles of the fluid not transmissive of the ultraviolet rays. This difficulty has been overcome by a reciprocation mechanism in heretofore used apparatus, to afford a complete turn-over of liquid several times during the process of exposure. Such mechanism is dispensed with by our present invention by maintaining such thinness of the subject fluid body as is above mentioned as an example. This distinguishing feature is important in our invention with its purpose of sufficiently extensive reduction in count of the organisms in the subject fluid.

Illustrated diagrammatically as incandescent lamps 13 with the usual parallel current distribution connections thereto, these lamps will be understood to be such as radiate any suitable form of energy effective to reduce the count of any given organisms in the subject fluid in space 7. For purpose of illustration and example, ultra violet rays may be radiated if lamps 13 are Sperti filter lamps, fully disclosed in United States Patents No. 1,676,579 and No. 1,982,029. Such lamp may be characterized for the purpose of elucidation and defining the invention herein, as one from the light of which substantially all energy shorter than 2650 Angstrom units, indicated by the symbol Å, has been removed. Satisfactory but less desirable results may be achieved with sources emitting wave lengths shorter than the limit just mentioned. Such a filtered light will kill the bacteria without inactivating the enzymes. A lamp not of the filtered type may be used with a filter between the lamp and the vessel, as vessel A, b, etc., of the character insuring the desired wave length. In general, the filtering, in either example just cited, will be considered as one which has a predominance of the energy in the range of 2600 Å.

The inlet 9 has in it a valve 14 between vessel A and its connection 15 with the bottom of vacuum tank 16 which receives the subject liquid through its top inlet 16a, in the case of milk, for instance, from the milking apparatus. A shelf 17 supports tank 16 on the adjacent wall of tank 1. Outlet 8 of vessel A is connected to inlet 8' of vessel B by connection 18. Outlet 9' of vessel B has in it a valve 19; and a connection 20 curves down to any suitable vacuum tank 21 of a bottling apparatus. For conventional illustration of such apparatus, tank 21 is shown with bottom outlet 21a with a suitable bottle-top sealing gasket 21b on its lower end to make sealing contact with the neck rim of bottle C that is to be filled. A branch pipe 22 leads from outlet 21a, understood to be connected with any suitable vacuum-maintaining device. This branch pipe 22 has in it the valve 22a; and between this branch pipe and tank 21 the outlet 21a has in it the valve 23. The bottle is carried by suitable elevating and lowering means, conventionally represented as a shelf 24 slidable up and down on a guide 24a under the action of suitable manipulating means 24b. The top of tank 21 is shown having a pipe 21c leading from its top, understood to lead to the vacuum-maintaining device above mentioned. A level of the liquid is indicated at D, in tank 21; pipe 21c having its air entrance thus in a dry space b above the liquid level D.

The bottle C is raised into sealing contact with outlet gasket 21b while tank outlet valve 23 is closed; branch pipe valve 22a being opened, to exhaust the air from bottle C. Then valve 22a is closed and valve 23 is opened; upon which the liquid, which is under vacuum throughout the system from supply tank 16, descends by gravity into the like vacuum in bottle C. The suction through tank pipe 21c induces the flow through the system, i. e., vessels A, B, etc., and their connections, from supply tank 16 with the vacuum of the milking apparatus or the like, to last outlet 9' and connection 20, through which the liquid descends by gravity into filling tank 21. In order to distribute the flow of the subject liquid in spaces 7 of vessels A and B, each vessel has between its shells 5 and 6 the baffles 4' at each side, stopping short of the bottom of the vessel, leaving a bottom passage 4". Thus the liquid must flow down in space 7, and pass through passageway 4" to rise to the vessel outlet; and a proper constriction of passageway 4" insures a properly uniform spreading of the liquid all around and along the half-circle of passage 7, both in the first downward and the second upward flow of the liquid.

The connections between vessels A and B and between vessel A and the supply means and between vessel B and the receiving means, 9", 18 and 20, respectively, preferably are flexible, to permit of independent movement or mounting of the several vessels, such as, with rigid connections, might result in breakage of the vessels.

A modified apparatus is illustrated in Figs. 4 to 8, inclusive, comprising a frame unit 25 composed of a base 26 having a facing plate 27 secured by screws 28 for holding a ray admitting plate 6', such as quartz or "Corex" glass, in spaced relation from the base. A gasket 30 is inserted between the base plate and the ray admitting plate, and a similar gasket 31 is inserted between the ray admitting plate and the frame plate 27. The spaced ray admitting plate provides an inclosed chamber 33 through which liquid may be fed from an inlet 34 and discharged through an outlet 35. The width of the space between the chromium plated or aluminum base plate and the ray admitting plate is from 2 to 3 millimeters.

This modified apparatus may be substituted, if desired, in the system for the double walled vessel units 4 in the embodiment shown in Figs. 1 and 2.

This modified apparatus is particularly adapted for experimental and laboratory work with the liquids and is more adapted for an intermittent system or where smaller quantities of liquid are being treated. Therefore the transparent glass cylinders 36 and 37 are provided with graduated scales 38 to measure the volume of the liquid which is to be treated. A plunger or piston 39 is snugly fitted within the cylinder to be manually actuated by handle 40, whereby the liquid to be treated can be forced into the chamber 33 under the plate through which the ultra-violet rays with their germicidal action may be projected from any ultra-violet ray lamp 13'. The cylinder adjacent the outlet is graduated and of the same construction as the graduated channel first described. It also is provided with a plunger. By this combination the operator can readily measure any given quantity which is to be subjected to the light treatment and can easily project it into the chamber beneath the ray admitting plate and then expel same. Or it can be returned into the treating chamber beneath the ray admitting plate for repeated treatment.

The lamp 13' is positioned about ten to 15 centimeters from the plate 6'.

A filter such as above described may also be employed in this embodiment and may be placed on the lamp which is used or a separate filter or screen coextensive with the area of the ray admitting plate.

In this embodiment the apparatus is a complete unit and of a relatively small area, so that the whole unit is under the rays of the lamp, including the ray admitting plate, the plunger cylinders, and the plungers including the handles. If any bacteria is on the exposed surface of the apparatus it will also be killed by the source of light.

A cooling system may also be conveniently employed with this embodiment. For instance, the unit may be set in a pan of ice water to absorb the heat from the lamp and to prevent any elevation in temperature of the fluid being treated.

Since the bacteria are not killed by the heat, the protoplasm in the cell and its chemical agencies are therefore not changed in their chemical compositions. Therefore the desirability of cooling in order to get advantageous results.

A protection plate 41 is preferably affixed to the base plate 26 by screws 42 and extended to underlie the cylinders 36 and 37 to prevent them from being broken.

Figure 10:
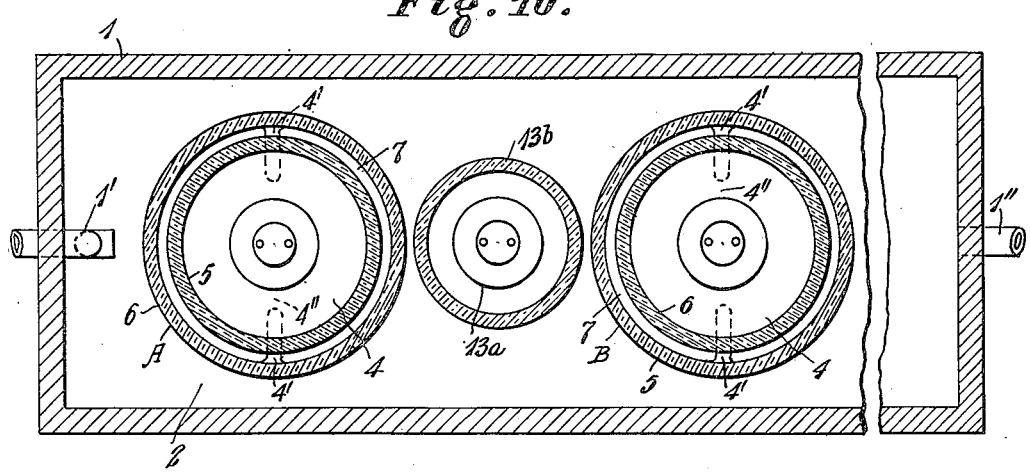
Fig. 10 is a plan view of this third embodiment.

The third modification illustrated in Figs. 9 and 10 differs from the first example of Figs. 1 and 2, in that additional energy emitting lamps are interposed between each two adjacent vessels, as A', B' and C', exteriorly thereto. These lamps 13a understood to be of the same character as the lamps 13 interiorly of the vessels, have respective casings 13b, of material transmissive of the rays of the lamps, excluding the cooling liquid 3 from them. They are connected in multiple with the vessel-interior lamps 13 as conventionally indicated. In this case, it is necessary for the outer shell 6 to be of conductive character like the inner shell 5, to transmit the energy, as for example ultra-violet rays if the lamps 13 and 13a are of the type for emitting such rays, as the Sperti lamp hereinbefore mentioned. In this arrangement, the subject fluid in passage 7 is impacted at both sides of its body by the rays, which thus the more effectively reach the organisms in the proportion of their reduced necessary travel across the fluid body.

In either example, that of Figs. 1 and 2, or that of Figs. 9 and 10, the center of energy source, in lamp 13 of the one, or the energy sources 13 and 13a of the latter example, should be at a distance from the nearer shell, 5 in the first and 5 and 6 respectively in the second example, of about 10 to 15 centimeters. Any number of lamps, vertically disposed at intervals, may be used as will substantially fulfill these requirements.

The equation for the light absorption of the liquid being treated is as follows:

$$I_d = I_o e^{-Td}$$

$I_d$ is the intensity of the transmitted light beam in liquid at any depth; $I_o$ is the initial intensity of the beam; $T$ is the absorption coefficient of the liquid; the thickness or depth at which the liquid is being irradiated is designated by "$d$," and "$e$" is the base of the Napierian logarithm. Under our invention, irradiation is conducted where $I_d$ is equal or greater than .05 $I_o$, or otherwise expressed, the intensity of the transmitted beam $I_d$ will be 5% or more of the incident beam $I_o$ with the wave length shorter than 3100 Å.

The ultraviolet rays emitted from the source 13, or the sources 13 and 13a, also cause the formation of ozone in the space between the source and the near shell 5, or shells 5 and 6, as the case may be; but the ozone will pass out through the open end of the inner shell 5 of the double-shell vessel. The two shells are sealed together to maintain vacuum. There is no impairment of liquid in passages 7 or through it and cooling liquid 3 by heat developed in the light treatment, which kills only the bacteriological impurities and does not in any way disadvantageously affect the liquids.

The cooling medium may be such as to absorb only the heat generated by the lamps 13, or 13 and 13a, and not to cool the liquid in spaces 1 below the normal temperature, or this cooling may be such as to cool such liquid below normal temperature.

While we have shown and particularly described three specific apparatuses for carrying our invention into effect, it will be understood that there may be various changes without departing from the spirit of the invention.

We claim:

1. In apparatus for irradiating liquids with ultraviolet rays, the combination of wall members with mutually facing substantially parallel surfaces, arranged to provide a tortuous space of a uniform width enclosed between said members, said space having an inlet and an outlet for the subject liquid, means sealing exposed edge regions of said members together, means for supplying said liquid under pressure to cause it to fill said space uniformly and with substantially the same velocity and pressure throughout to form a uniformly adequately thin film of the liquid flowing from the inlet to the outlet, at least one of said members being conductive of the ultraviolet rays, and means for radiating said rays to the outer exposed side of said one of said members, at least one member being directly exposed to a cooling medium so as to efficiently conduct heat from the film and the other member being exposed directly to the ultraviolet rays.

2. Apparatus as set forth in claim 1, in which one of the members is substantially conductive of the ultraviolet rays, and in which the other member is at least predominantly reflective of said rays, to cause a return passage, through the film, of rays with a substantial residue of their energy not exerted on the subject liquid in their first passage through said liquid.

3. Apparatus as set forth in claim 1, in which one of the members is conductive of the ultraviolet rays, and in which portions of the radiating means are so located as to radiate to the outer exposed sides of the respective members.

4. Apparatus as set forth in claim 1, in which is included means for holding a liquid against the surface of the therein mentioned other member opposite to its film-contacting surface.

5. Apparatus as set forth in claim 1, in which the members are substantially extended around the radiating means, in their parallelism, in the therein described radiating relation to said radiating means.

6. A method of irradiating liquids which comprises the tortuous passage of a thin film of the liquid of uniform thickness enclosed and under pressure in its enclosure, whereby the film is substantially uniformly thin over an extended area and with substantially the same velocity and pressure throughout, and conducting ultraviolet rays through a part of said enclosure to at least one side of said film in the course of its passage, and cooling the film in the course of said passage by effective thermal connection of its opposite side to a coolant medium.

7. A method as set forth in claim 6, in which the cooling is effected by a liquid contacting the enclosure side that contacts the therein mentioned opposite side of the film.

8. A method as set forth in claim 6, in which the film extends around the radiating means and flows in one direction along a side of the radiating means, then across, and then along another side of the radiating means, with its substantially uniform thickness and pressure maintained at least substantially throughout its passages along at least the sides of the radiating means.

9. In apparatus for irradiating liquids with ultraviolet rays, the combination of wall members with mutually facing substantially parallel surfaces arranged to provide a tortuous space of uniform width enclosed between said members, said space having an inlet and an outlet for the subject liquid, means sealing exposed edge regions of said members together, means for supplying said liquid under pressure to cause it to fill said space uniformly and with substantially the same velocity and pressure throughout to form a uniformly adequately thin film of the liquid flowing from the inlet to the outlet, at least one of said members being conductive of the ultraviolet rays, and means for radiating said rays to the other exposed side of said one of said members, at least one member having its film contacting surface directly exposed to a cooling medium as to efficiently conduct heat from the film and the other member exposed directly to the ultraviolet rays, said members being telescoped shells, each with a closure at one end, the closures mutually facing as walls therein mentioned, the opposite ends being the edge regions connected as therein set forth, both inlet and outlet being at said opposite ends, and said apparatus including baffle means along the space between mutually facing shell walls at remote sides of the combination but discontinuous between end closures of the shells, and said inlet and outlet being respectively at remote sides of the baffle means, whereby the subject liquid is permitted a partial flow from side to side between shell walls and is permitted a complete flow from inlet to outlet between the shell end closures.

10. In apparatus for irradiating liquids with ultraviolet rays, the combination of wall members with mutually facing substantially parallel surfaces arranged to provide a tortuous space of uniform width enclosed between said members, said space having an inlet and an outlet for the subject liquid, means sealing exposed edge regions of said members together, means for supplying said liquid under pressure to cause it to fill said space uniformly and with substantially the same velocity and pressure throughout to form a uniformly adequately thin film of the liquid flowing from the inlet to the outlet, at least one of said members being conductive of the ultraviolet rays, and means for radiating said rays to the other exposed side of said one of said members, at least one member having its film contacting surface directly exposed to a cooling medium as to efficiently conduct heat from the film and the other member exposed directly to the ultraviolet rays, said members being telescoped shells, each with a closure at one end, the closures mutually facing as walls therein mentioned, the opposite ends being the edge regions connected as therein set forth, both inlet and outlet being at said opposite ends, and said apparatus including baffle means along the space between mutually facing shell walls at remote sides of the combination but discontinuous between end closures of the shells, and said inlet and outlet being respectively at remote sides of the baffle means, whereby the subject liquid is permitted a partial flow from side to side between shell walls and is permitted a complete flow from inlet to outlet between the shell end closures, the inner shell being conductive of the ultraviolet rays, and the therein mentioned means for radiating said rays being within said inner shell.

11. In apparatus for irradiating liquids with ultraviolet rays, the combination of wall members with mutually facing substantially parallel surfaces arranged to provide a tortuous space of uniform width enclosed between said members, said space having an inlet and an outlet for the subject liquid, means sealing exposed edge regions of said members together, means for supplying said liquid under pressure to cause it to fill said space uniformly and with substantially the same velocity and pressure throughout to form a uniformly adequately thin film of the liquid flowing from the inlet to the outlet, at least one of said members being conductive of the ultraviolet rays, and means for radiating said rays to the other exposed side of said one of said members, at least one member having its film contacting surface directly exposed to a cooling medium as to efficiently conduct heat from the film and the other member exposed directly to the ultraviolet rays, said members being telescoped shells, each with a closure at one end, the closures mutually facing as walls therein mentioned, the opposite ends being the edge regions connected as therein set forth, both inlet and outlet being at said opposite ends, and said apparatus including baffle means along the space between mutually facing shell walls at remote sides of the combination but discontinuous between end closures of the shells, and said inlet and outlet being respectively at remote sides of the baffle means, whereby the subject liquid is permitted a partial flow from side to side between shell walls and is permitted a complete flow from inlet to outlet between the shell end closures, only one of said shells being conductive of the ultraviolet rays, and the other shell being at least predominantly reflective of said rays, to cause a return passage through the film, of the rays with a substantial degree of the energy which was residual in the rays after their direct passage through the film, the therein mentioned radiating means being within the inner shell.

12. In apparatus for irradiating liquids with ultraviolet rays, the combination of wall members with mutually facing substantially parallel surfaces arranged to provide a tortuous space of uniform width enclosed between said members, said space having an inlet and an outlet for the subject liquid, means sealing exposed edge regions of said members together, means for supplying said liquid under pressure to cause it to fill said space uniformly and with substantially the same velocity and pressure throughout to form a uniformly adequately thin film of the liquid flowing from the inlet to the outlet, at least one of said members being conductive of the ultraviolet rays, and means for radiating said rays to the other exposed side of said one of said members, at least one member having its film contacting surface directly exposed to a cooling medium as to efficiently conduct heat from the film and the other member exposed directly to the ultraviolet rays, said members being telescoped shells, each with a closure at one end, the closures mutually facing as walls therein mentioned, the opposite ends being the edge regions connected as therein set forth, both inlet and outlet being at said opposite ends, and said apparatus including baffle means along the space between mutually facing shell walls at remote sides of the combination but discontinuous between end closures of the shells, and said inlet and outlet being respectively at remote sides of the baffle means, whereby the subject liquid is permitted a partial flow from side to side between shell walls and is permitted a complete flow from inlet to outlet between the shell end closures, both of said shells being conductive of the ultraviolet rays, and the therein mentioned radiating means being partly within the inner shell and partly outside the outer shell in effective radiating relation to the space between the shells.

13. In apparatus for irradiating liquids with ultraviolet rays, a plurality of operating units, each comprising wall members with mutually facing substantially parallel surfaces arranged to provide a tortuous space of a uniform width of no more than three (3) millimeters enclosed between said members, said space having an inlet and an outlet for the subject liquid, means sealing exposed edge regions of said members together, means for supplying said liquid under pressure to cause it to fill said space uniformly and with substantially the same velocity and pressure throughout, to form a uniformly adequately thin film of the liquid flowing from the inlet to the outlet, at least one of said members being conductive of the ultraviolet rays, and means for radiating said rays to the outer exposed side of said one of said members, at least one member having its film contacting surface directly exposed to a cooling medium as to efficiently conduct heat from the film and the other member exposed directly to the ultraviolet rays, each two adjacent units having the outlet of one unit in liquid-conducting connection with the inlet of the next unit, whereby the liquid is subjected to repeated irradiations in the series of units.

ALPHONSE LANG.
GEORGE S. HAWKE.